Sept. 24, 1963   F. H. FIELD   3,104,687
RADIAL ARM SAW

Filed Sept. 6, 1960   8 Sheets-Sheet 1

INVENTOR.
FRANK H. FIELD
BY
ATTORNEYS

Sept. 24, 1963   F. H. FIELD   3,104,687
RADIAL ARM SAW
Filed Sept. 6, 1960   8 Sheets-Sheet 2

INVENTOR.
FRANK H. FIELD
BY
Fisher & Swain
ATTORNEYS

Sept. 24, 1963 F. H. FIELD 3,104,687
RADIAL ARM SAW
Filed Sept. 6, 1960 8 Sheets-Sheet 3

INVENTOR.
FRANK H. FIELD
BY
Flehr & Swain
ATTORNEYS

Sept. 24, 1963 F. H. FIELD 3,104,687
RADIAL ARM SAW
Filed Sept. 6, 1960 8 Sheets-Sheet 4

INVENTOR.
FRANK H. FIELD
BY
*Flehr & Swain*
ATTORNEYS

FIG. 11

INVENTOR.
FRANK H. FIELD

INVENTOR.
FRANK H. FIELD

*INVENTOR.*
FRANK H. FIELD
BY
ATTORNEYS

Sept. 24, 1963    F. H. FIELD    3,104,687
RADIAL ARM SAW

Filed Sept. 6, 1960    8 Sheets-Sheet 8

INVENTOR
FRANK H. FIELD

ATTORNEYS

United States Patent Office 3,104,687
Patented Sept. 24, 1963

3,104,687
RADIAL ARM SAW
Frank H. Field, Cincinnati, Ohio, assignor, by mesne assignments, to Magna American Corporation, Cincinnati, Ohio, a corporation of Ohio
Filed Sept. 6, 1960, Ser. No. 54,145
5 Claims. (Cl. 143—6)

This invention relates to radial arm saws.

Radial arm saws are well known and, generally speaking, they are devices in which a work piece is held in a stationary position on a work piece supporting table and a saw blade is moved over and through the work piece to effect the desired cut. The device is so constructed that it may be used to perform cross cut, right and left hand miter cut, bevel cut, bevel-miter cut and rip cut operations. In addition, by the utilization of special attachments, rabbeting, dadoing, tenoning, routing, drilling, jointing, grinding, shaping, sanding and molding operations may be effected.

In a typical radial arm saw construction the saw and all of its supporting and driving mechanism, including the vertical column upon which it is mounted, are raised and lowered with respect to the workpiece and to the work piece supporting table to determine the depth of cut.

It is an object of this invention to provide a construction in which the column is rigidly secured to the base and in which the saw and its associated mechanism, including the motor, cradle, carriage and arm are raised and lowered along the supporting column to determine the depth of cut. In such a construction the supporting column is not raised and lowered. It is obvious that when the column is fixed to the base, one tolerance is eliminated and a more rigid structure is provided. In order to enhance the rigidity of the column, I support it on a new base construction which consists of four channel members laid on their sides and secured together to create a box and a second pair of channel members positioned within the box to form an A frame. The column is bolted to the A frame at the apex of the A and the box and A frame construction thus provide not only a rigid support for the vertical column but a support for the work piece supporting table.

The tracks or rails which support the carriage are ordinarily formed as a part of the radial arm. It is an object of this invention to provide carriage support guide rails which are spaced as far apart laterally as possible to provide utmost stability. To this end, therefore, I have positioned the guide rails on the outer side walls of the arm and, in addition to enhancing carriage stability, this construction permits simple manufacturing techniques and accurate and speedy carriage control.

Heretofore most radial arm saws have been so constructed that the saw blade and its supporting arbor are mounted directly upon the motor shaft with the result that the depth of cut for a particular saw blade has been materially reduced. Some manufacturers have sought to overcome this difficulty by providing motors of peculiar designs and shapes.

It is an object of this invention to provide maximum depth of cut together with the utilization of a conventional electric motor. I accomplish this by mounting a conventional electric motor in a position remote from and above the spindle whereby it will not interfere with the cutting operation. In this manner the greatest possible cutting depth may be obtained from the saw blade of a given diameter.

Moreover, in conventional radial arm saw construction the saw blade is adapted only to be driven from one end of the drive shaft. The plant of rotation of the saw blade, when radial arm saw is being used in a conventional cross-cut operation, is not coplanar with a vertical plane passing through the radial arm and the supporting post, but is offset to the left with respect thereto. Under these circumstances, a work piece support or table provides greater support when the apparatus is used for a right hand miter cut than when it is used to make a left hand miter cut.

It is an object of this invention to provide a double ended drive shaft capable of supporting a saw blade on either end. Thus, when the blade is mounted on the right end of the shaft, when viewed from the front of the device, the path of the blade during a left hand miter cut more nearly approximates the center of the table.

In the past, radial arm saws have been limited in their use since they conventionally provide only a single speed drive.

It is an object of this invention to provide a radial arm saw which is provided with a speed change mechanism whereby the proper driving speed may be obtained for any operation or for any depth of cut or type of material being cut.

In ordinary radial arm saw constructions the controls for raising and lowering the saw blade are usually positioned on the supporting column.

It is an object of this invention to provide simple control means for raising and lowering the saw blade for determining the depth of cut by placing the raising and lowering control means in front of the table instead of at some dangerous location on the supporting column.

The work piece supporting table on conventional radial arm saws is rigidly secured to the base. This materially limits the utility of the saw.

It is an object of this invention to provide a radial arm saw having a sliding work piece supporting table whereby the work piece supporting table may be moved to and locked in any desired position or in which the saw blade and its carriage may be locked in a particular position and the work piece supporting table may be moved with respect to the saw blade. The utility of a sliding table in a radial arm saw construction will be apparent in the further reading of this specification.

The foregoing and other objects and advantages of this invention may be made clear in the following specification taken in conjunction with the accompanying drawings, in which.

Figure 1:
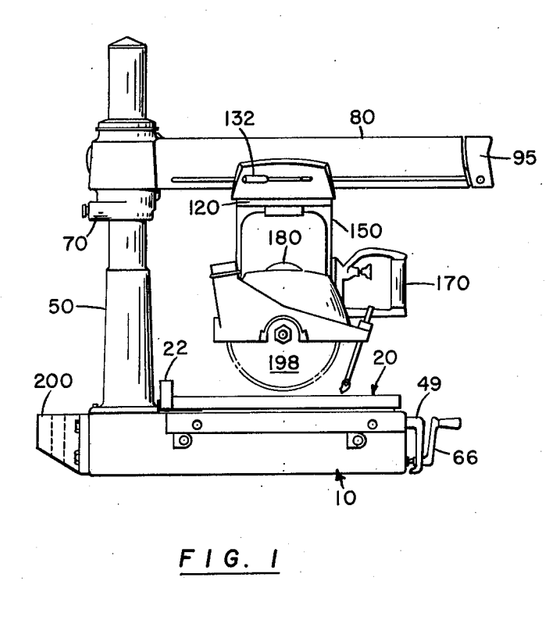
FIGURE 1 is a side elevational view showing my new radial arm saw with the sliding table in fully retractable position and showing the arm and saw positioned above the table.
Figure 2:
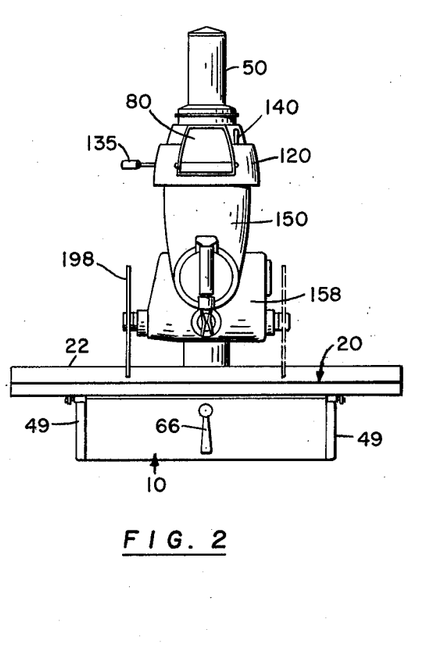
FIGURE 2 is a front view of the device illustrated in FIGURE 1 showing the saw blade, in full line, on the left hand end of the drive shaft and also showing a saw blade, in dotted line, on the right hand end of the drive shaft.

As illustrated generally in FIGURES 1 and 2, my radial arm saw consists generally of a frame assembly 10, work piece supporting table assembly 20, a column 50, a collar 70, arm 80, carriage 120, yoke 150, motor support cradle 153, motor 180, and saw blade 198.

Figure 3:
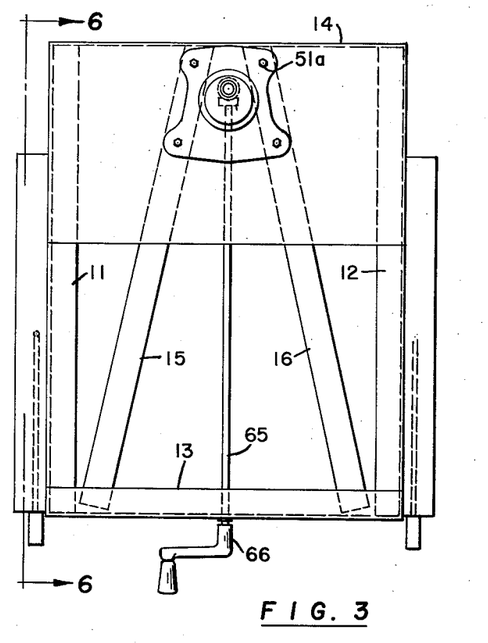
FIGURE 3 is a top view of the frame with the table and all parts other than the column removed.

The frame assembly 10 is best shown in FIGURE 3.

The frame consists of side channel members 11 and 12 and front and rear channel members 13 and 14 which are welded or bolted together in any suitable manner. Similar channel members 15 and 16 are secured to channel members 13 and 14 and form an A frame member of great rigidity.

Figure 6:
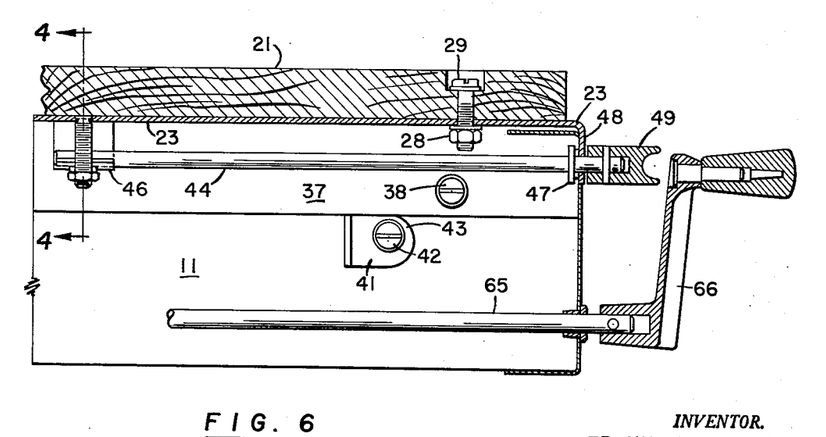
FIGURE 6 is an enlarged fragmentary side view of the table support construction showing the position of the saw raising and lowering control device, the table locking and releasing device, and the table leveling device.
Figures 7, 8:
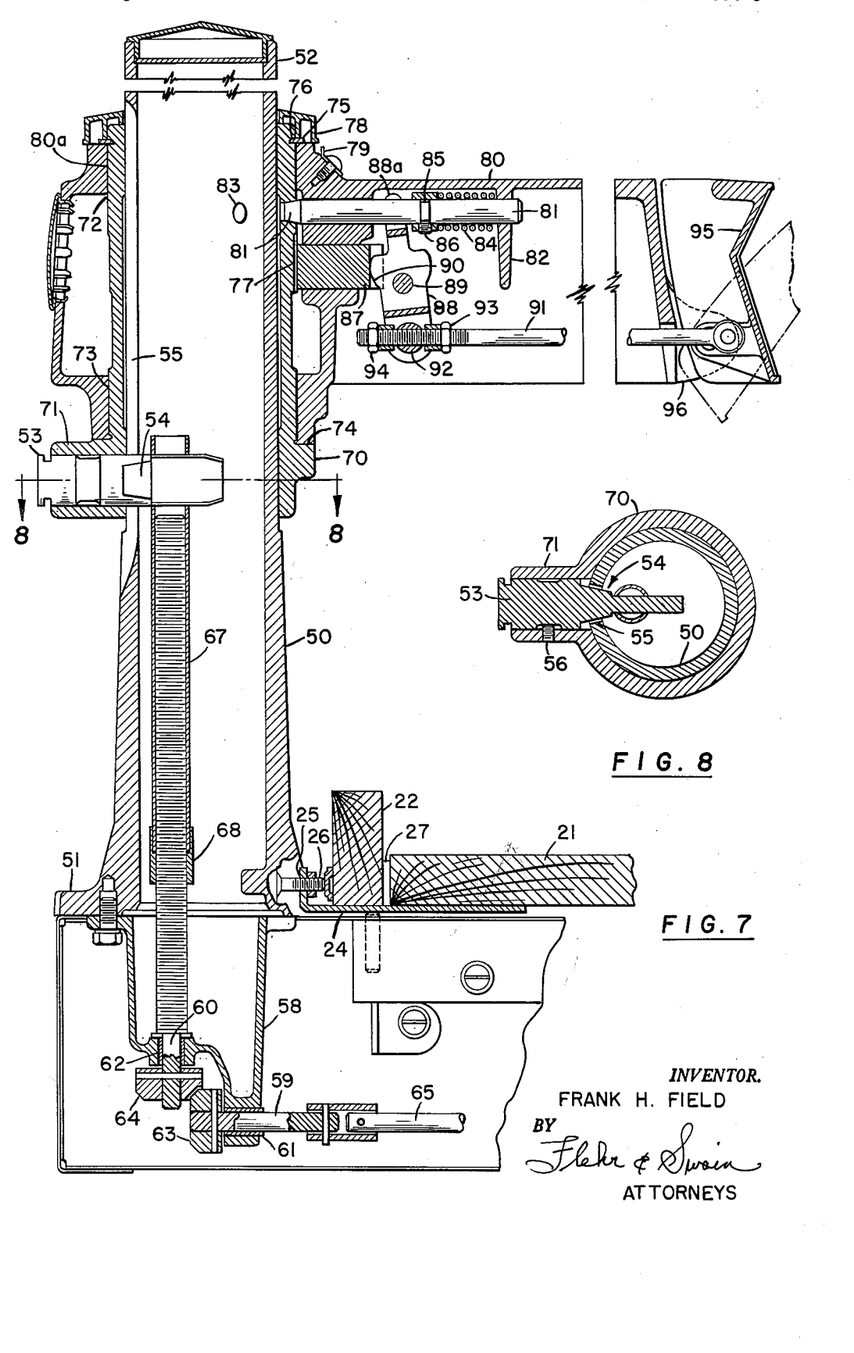
FIGURE 7 is an enlarged cross-sectional detail illustrating the column, the raising and lowering collar, the arm, the collar and arm raising and lowering mechanism and the means for supporting and locking the arm with respect to the collar and column.
FIGURE 8 is a cross-sectional view taken along the lines 8—8 of FIGURE 7 showing the means for connecting the raising and lowering members to the collar.

The frame assembly 10 supports a table assembly 20 which is best illustrated in FIGURES 6 and 7. The table assembly 20 consists of a flat work piece supporting member 21, together with a fence 22. The supporting member 21 is mounted on a pair of parallel spaced flanged members 23 which are secured to its lower side. A pair of L-shaped brackets 24 are also secured to a lower side of the member 21 near its back edge to support the fence 22. They are provided with threaded orifices 25 which receive bolts 26. The inner ends of the bolts 26 engage the fence 22 and, by tightening or loosening bolts 26, the fence 22 may be loosened for removal or may be positioned as indicated generally in FIGURE 7. Spacer elements 27 may be placed between the member 21 and fence 22, to provide slots at various intervals in the area between the members 21 and 22 through which sawdust may fall to clear the top of the member 21.

Figure 4:
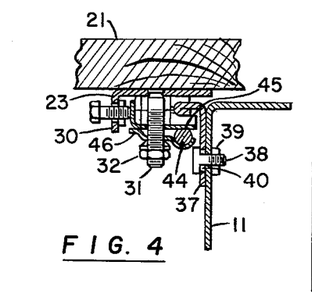
FIGURE 4 is a cross-sectional view taken along the line 4—4 of FIGURE 6 showing table supporting and locking means.
Figure 5:
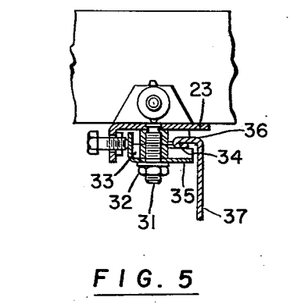
FIGURE 5 is a fragmentary view from the rear of the table and fence showing a rear view of the table support members which do not incorporate the locking mechanism.

The members 23 are secured to member 21 by nuts and bolts 28 and 29. The members 23 are flanged as indicated in FIGURES 4 and 5 to provide a downwardly extending rib 30. The members 23 also each accommodate two downwardly extending threaded bolts 31 which receive nuts 32. As indicated in FIGURES 4 and 5, bolts 31 also accommodate a pair of substantially identical glide shoes 33 which are shaped to cooperate to form a rail receiving slot 34. Backing plates 35 support the lower shoes 33 and by turning the nuts 32 on the bolts 31 one can urge the shoes 33 toward and away from each other thereby increasing or decreasing the width of slot 34. Slot 34 in guide shoes 33 is designed to receive a rail member 36 which is a flange or lip formed on one side edge of member 37. Member 37 is secured to the outer side walls of frame 10 by nut and bolt combinations 38 and 39. The bolt 38 passes through an elongated slot 40 in member 37 whereby the member 37 and its associated rail 36 may be raised and lowered within the limits defined by slots 40.

There are four glide shoe assemblies secured to the lower side of the work piece supporting member 21 and they support the member 21 for longitudinal movement along the rails 36. By adjusting the nuts 32 the tolerance between the walls of slot 34 and the rail 36 may be varied to control the fit and ease with which the table may be moved.

The table may be leveled by adjusting the horizontal position of the rails 36 by means illustrated in FIGURES 6 and 7. Identical cams 41 are rotatably mounted on bolts 42 which threadedly engage the side walls of the channels 11 and 12. The cam surfaces 43 engage the lower edge of the members 37. The orifices which accommodate the bolts 42 are offset so that by rotating the cams 41 about the bolts 42, the end of the member 37 adjacent a particular cam 41 can be raised or lowered with respect to the frame 10. By tightening the bolt 42, after the cam 41 has been turned to a predetermined position (and the rail 37 raised or lowered) the rail 37 may be permanently locked in that position.

As previously pointed out, the work piece supporting member 21 is adapted to be moved along the rails 36. It is also adapted to be locked in a predetermined position along the rails 36 by a locking means which consists of a pair of shafts 44 which are best shown in FIGURES 4 and 6. Shafts 44 are supported at one end by clamps 46 supported on bolts 32 and at their forward ends in bearings 47 which are accommodated in a turned down extension 48 at the forward end of the member 23. Shafts 44 are provided with flatted surface 45 which engages backing plates 35 when the shaft is rotated to the position indicated in FIGURE 4. Handles 49 are suitably pinned to the shafts 44 so that the shafts 44 may be rotated. When a shaft 44 is rotated to the position indicated generally in FIGURE 4, in which position the flatted surface 45 engages the lower side of the backup plate 35, the shoes 33 are permitted to separate as shown and the shoes 33 are free to slide upon the guide 36. However, when the shaft 34 is turned so that the flatted portion 45 no longer engages the lower side of the member 35, the member 35 is urged upwardly and the two shoes 33 are likewise urged together into clamping engagement with the guide rail 36, thereby locking the table 21 with respect to the frame 10.

Column 50 is best illustrated in FIGURE 7, and consists of a tubular casting which is provided with a flange 51 at its lower end and with a cylindrical machined surface 52 at its upper end. It is secured to frame 10 by bolts 51a (illustrated in FIGURE 3) which pass through the flange 51 and through the upper side walls of the channels 15 and 16, and through the rear channel member 14.

The machined surface 52 provides a support for a collar 70 which may be caused to move longitudinally therealong. Rotation of the collar 70 is prevented by pin 53, which is accommodated in a bore in one side wall of collar 70 and whose tapered extension 54 is accommodated in an elongated vertical slot 55 in the member 52. Set screw 56 in the wall of the bore which supports the pin 53 controls the tolerance between the walls of the tapered pin extension 54 and the mating tapered walls of the slot 55. At any rate, it is apparent from FIGURE 8 that the collar 70 cannot rotate with respect to the column 50 because of the positioning of the pin 53 in the slot 55.

The lower end of column 50 supports housing 58 which, in turn, supports a pair of shafts 59 and 60 in suitable bearings 61 and 62. Shafts 59 and 60 are provided with bevel gears 63 and 64, respectively, which are pinned thereto in any suitable manner. Shaft 61 is provided with an extension 65 which extends forwardly through bearing in the front wall of the frame 10 and terminates in a suitable handle 66 (FIGURE 6). Rotation of the handle 66 results in rotation of the shaft 65, gear 63, gear 64 and shaft 60.

Tube member 67 fits over the upper threaded portion of the shaft 60 and internally threaded member 68 engages the threaded portion of the shaft 60. The upper end of the tube 67 is slotted to receive the free end of the pin 53 as illustrated in FIGURES 7 and 8. Rotation of the shaft 60 in the manner previously described causes the threaded member 68 to be moved upwardly or downwardly along the shaft 60 and this upward or downward movement of the member 68 is transmitted to the collar 70 through the tube 67 and pin 53.

Collar 70 is generally cylindrical in shape except for a boss 71 which accommodates the bore which supports the pin 53. It is provided with external cylindrical surfaces 72 and 73 which support the arm 80 and permit it to rotate with respect thereto. A flange 74 supports the arm 80 in a predetermined vertical position on the collar 70. A snap ring 75 which is seated in an annular groove 76 prevents unwanted upward movement of the arm 80 with respect to the collar 70. Collar 70 is also provided with a surface 77 whose purpose will more fully hereinafter be described. Nonrotatably mounted miter cap assembly 78 has the degrees of the arc of the circle marked thereupon so that the user, by lining the pointer 79 (FIG. 7) on the arm 80 with the appropriate indicia on the miter cap 78 may determine the angle of rotation of the arm 80 about the collar 70 with respect to the fence 22.

Arm 80 consists generally of an elongated inverted channel-like casting which is provided at one end with an integrally formed tubular portion 80a. The inner walls of the tubular portion 80a are machined to fit similarly machined surfaces 72 and 73 with close tolerances. Normally the arm 80 is freely rotatable with respect to the collar 70. However, there are two locking assemblies associated with the arm 80 to lock it to the collar 70.

The first of these assemblies consists of an indexing pin 81, one end of which is supported in an orifice in web 82 in the arm 80 and the other end of which is supported in the side wall of the tubular portion 80a of the arm 80. The end of the pin 81 is tapered and is adapted to engage one of three similarly tapered indexing orifices 83 in the collar 70. The tapered orifice 83 illustrated in section in FIGURE 7 may be termed the 90° orifice. When the arm 80 is at right angles to the fence 22, pin 81 will be seated in orifice 83. Pin 81 is normally urged to the left, as viewed in FIGURE 7, by a spring 84, one end of which abuts the web 82 and the other end of which engages collar 85 secured to pin 81 by set screw 86. When the pin 81 is retracted from orifice 83, arm 80 may be rotated until pin 81 comes into registry with another of the indexing orifices 83a. Indexing orifices 83a are set at angles of 45° with respect to the orifice illustrated in FIGURE 7. By this means the user can immediately index the arm 80 at 45° angles with respect to the fence 22.

Arm 80 also accommodates a so-called arm lock member 87 which is adapted to reciprocate within a second bore in the wall of portion 80a of the arm 80, as indicated. When member 87 is urged to the left as viewed in FIGURE 7 its knurled surface engages the surface 77 of the collar 70 and locks the arm against movement with respect thereto. When member 87 is moved to the right as viewed in FIGURE 7, it is clear of surface 77 and the arm 80 may be rotated about the collar 70.

The means for actuating the pins 81 and 87 consists of a bifurcated lever 88 pivotally mounted at 89 within the arm 80. The upper end of the bifurcated lever 88 partially surrounds the pin 81 and, when the lever is moved in a clockwise direction as viewed in FIGURE 7, the arms 88a of the lever 88 engage the collar 85 and urge the pin 81 to the right against the spring 84, thus withdrawing pin 81 from one of the idexing orifices 83. Lever 88 is also provided with lobes 90 which may engage the free end of the pin 87, whereby when the lever 88 is moved further in a clockwise direction as viewed in FIGURE 7, lobes 90 disengage pin 87 permitting it to clear the surface 77. On the other hand, when lever 88 is moved in a counterclockwise direction as viewed in FIGURE 7, the arms 88a move to the left and permit spring 84 to urge pin 81 to the left, with the result that it will engage either an indexing orifice 83 or, if it is not in registry therewith, the smooth surface of the machined portion 72. Further movement of the arm 88 in a counterclockwise direction will urge lobes 90 against the cooperating face of the pin 87 and urge the same into intimate engagement with surface 77 thereby locking the arm 80 against rotation with respect to the collar 70.

Movement of the bifurcated arm 88 about pivot 89 is controlled by a shaft 91, one end of which is connected to the lower end of the bifurcated lever 88 by pivot pin 92. Adjustment of pin 92 along shaft 91 is accomplished by adjustment nuts 93 and 94 which are supported upon threaded portions of the shaft 91. The other end of the shaft 91 is pivotally connected to a handle 95 which is supported between extending lugs 96 on the end of the arm 80. Rotation of handle 95 in a clockwise direction about its pivotal mounting on lugs 96 urges the shaft 91 to the left as viewed in FIGURE 7 and rotates lever 88 in a clockwise direction. Pin 87 is first freed from surface 77 and pin 81 is then moved to the right as viewed in FIGURE 7. When handle 95 is swung upwardly in a counterclockwise direction as viewed in FIGURE 7, shaft 91 is moved to the right and arm 88 is rotated in a counterclockwise direction and disengages the collar 85. Lobes 90 engage pin 87 and urge it into engagement with the surface 77 on collar 70. If pin 81 is in registry with one of the indexing orifices 83, it will engage it.

Figure 9:
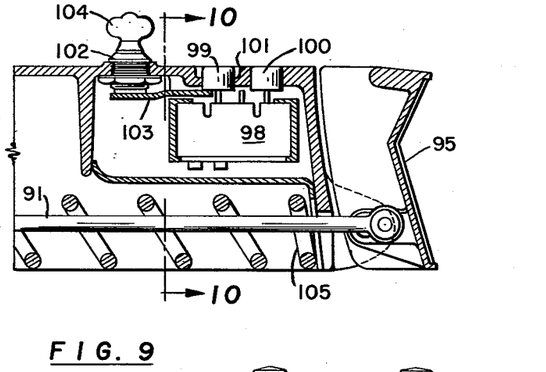
FIGURE 9 is an enlarged cross-sectional detail of one end of the arm showing the handle means for locking and releasing the arm with respect to the collar.
Figure 10:
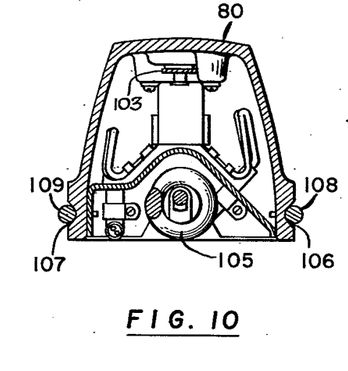
FIGURE 10 is an enlarged cross-sectional detail taken along the line 10—10 of FIGURE 9.

Reference to FIGURES 9 and 10 shows that arm 80 also accommodates a switch 98. Switch 98 is actuated by a pair of buttons 99 and 100. Button 99 is the "On" button and it will be noted that it is accommodated within a recess 101 in the upper surface of the arm 80. In order to actuate the saw, button 99 must be depressed and since it is supported in a recess 101, it is unlikely that the apparatus will accidentally be operated inasmuch as the upper surface of the button 99 is coplanar with the upper surface of the arm 80 when in "Off" position. The "Off" button 100 is normally urged upwardly from the position shown in FIGURE 9 when the "On" button 99 is depressed. Thus, "Off" button 100 is in elevated or exposed position when the device is being operated and it may be depressed with little or no effort to cause the device to be stopped. A locking assembly 102 is also provided and the member 102 supports a tongue 103 which, when the device is in locked position, extends to a position underlying the "On" button 99 so that the same cannot be depressed.

By actuating the key 104, tongue 103 may be swung from the position illustrated in FIGURE 9 so that the "On" button 99 may be depressed.

Shaft 91 supports a coiled electric conduit 105 which connects the switching mechanism 98 to motor 180 so that the circuit to the motor may be closed. A suitable electric conduit, not shown, connects the other side of the switch to a source of power whereby the entire apparatus may be energized.

Figure 11:
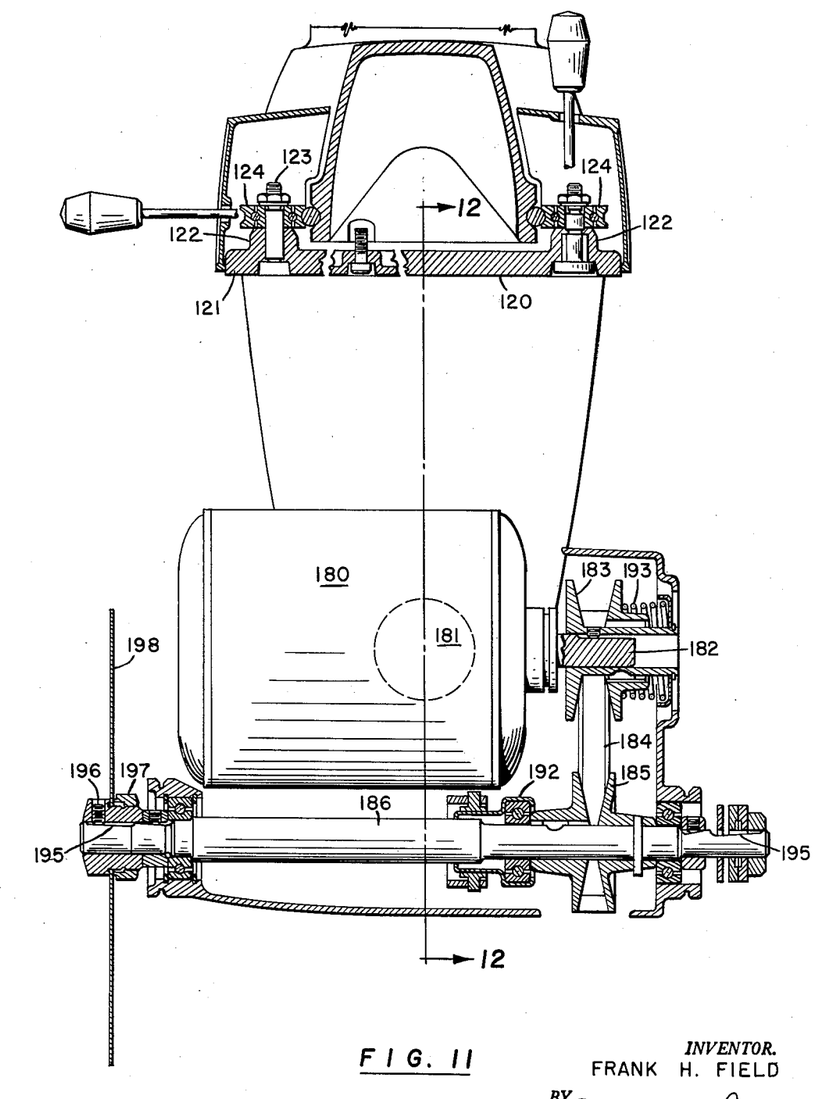
FIGURE 11 is an enlarged view, partially in cross section, showing the means for supporting the carriage upon the arm and further showing the speed change mechanism and the double ended drive shaft construction.
Figures 12, 13, 14:
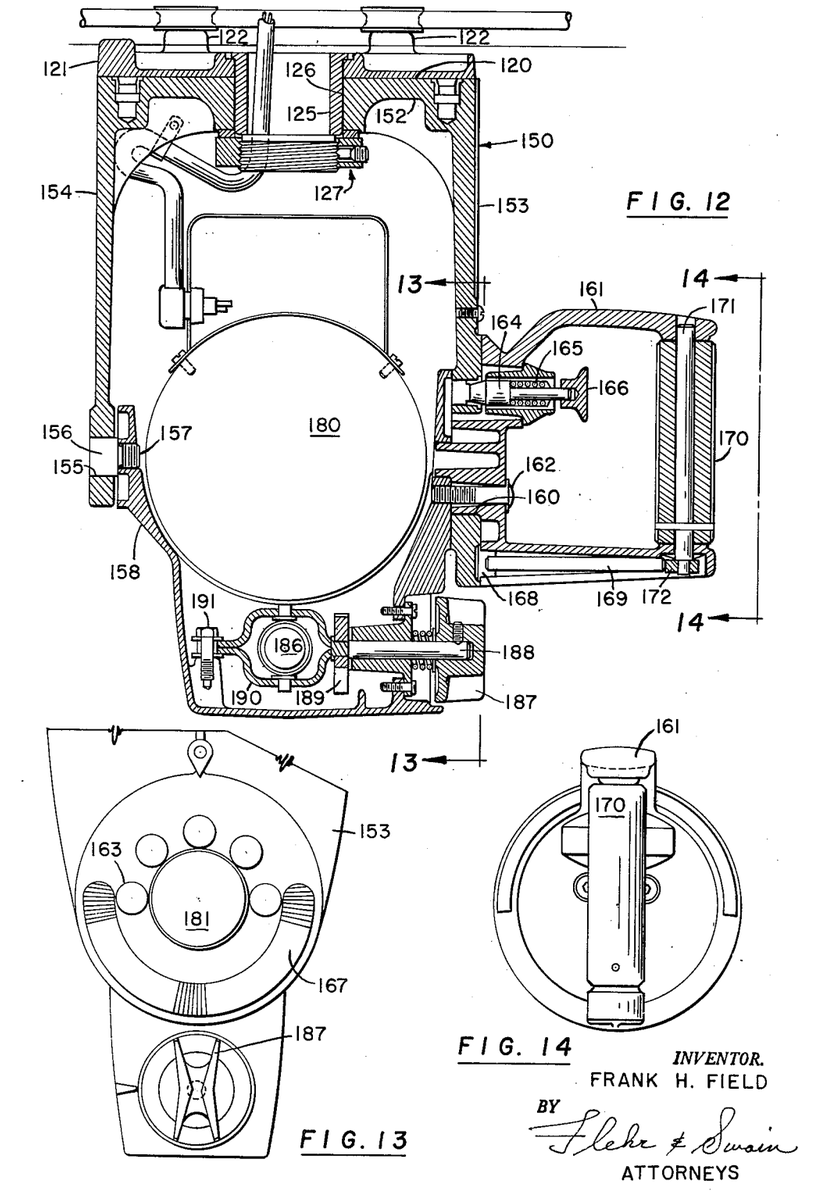
FIGURE 12 is a cross-sectional view taken along the line 12—12 of FIGURE 11 showing the yoke and carriage connection, the motor support assembly and the cradle which permits rotation of the motor and the saw.
FIGURE 13 is a fragmentary view of the front of the yoke taken along the lines 13—13 of FIGURE 12.
FIGURE 14 is a front view of the motor tilting handle taken along the lines 14—14 of FIGURE 12.

The arm 80 is also provided, as indicated particularly in FIGURES 10 and 12, with a pair of parallel extension channels 106 and 107. Channels 106 and 107 support a pair of guide rails 108 and 109 which are supported therein by any suitable means and whose purpose is to support the carriage assembly 120 which is best illustrated in FIGURES 11 and 12.

Carriage assembly 120 consists of a plate 121 which is provided with a plurality of bosses 122 which are drilled to receive bolts 123 which, in turn, rotatably support guide rollers 124. Guide rollers 124 engage the guide rails 108 and 109 and permit the carriage 120 to be moved fore and aft along the arm 80. Guide rollers 124 on the right hand side of the carriage (as viewed in FIGURE 11) are mounted upon eccentric bolts so that they may be moved laterally to compensate for wear of the guide rails 108 and 109 or the rollers 124. This technique is well known in the machine tool art.

The plate 121 is also provided with a downwardly centrally disposed tubular extension 125 which is provided with machined outer cylindrical surface 126. The member 125 is threaded at its lower end and is adapted to receive the yoke casting assembly 150 which is rotatably mounted thereon by a suitable thrust bearing assembly 127.

Figure 15:
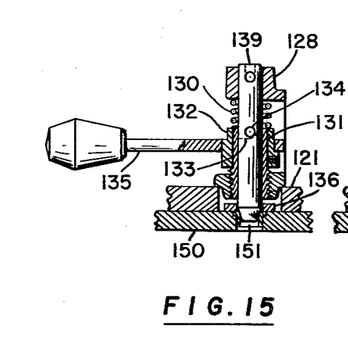
FIGURE 15 (Sheet 4) is a fragmentary cross-sectional view of the locking and indexing mechanism for controlling the rotation of the yoke with respect to the carriage.
Figures 16, 17, 18:
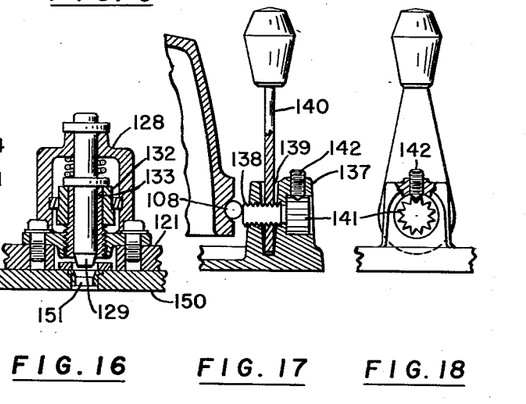
FIGURE 16 is a side view, partially in cross section, of the mechanism illustrated in FIGURE 15.
FIGURE 17 is a fragmentary view, partially in cross section, of means for locking the carriage with respect to the arm.
FIGURE 18 is a side view of the assembly illustrated in FIGURE 17.

It is obvious that some locking means must be provided to lock yoke 150 in a predetermined position with respect to the carriage. The locking means is illustrated in FIGURES 15 and 16. Yoke 150 is provided with four indexing orifices 151 set 90° apart. The carriage plate 121 is provided with a bracket 128 which slidably accommodates a plunger 129, which is normally urged downwardly by spring 130. The bracket 128 also rotatably supports a threaded bushing 131 which surrounds the plunger 129 and which is secured by a set screw to a body 132 provided with cam surface 133 which engages a pin 134 on the plunger 129 so that when the body 132 is rotated by handle 135, the camming action of the surface 133 against the pin 134 raises the plunger 129 against the spring 130 out of and away from the indexing orifice 151. Operation of the handle 135 in the opposite direction relieves the pin 134 and permits the pin 129 to drop downwardly. If the plunger 129 drops downwardly into one of the indexing orifices 151, the yoke is prevented from rotating with respect to the carriage. In the event, however, that the plunger 129 is not in registry with one of the indexing orifices 151, the threaded bushing 131 engages washer 136 pressing it against the upper surface of the yoke assembly 150 and further actuation of the handle 132 urges the bushing 131 and washer 136 into locking engagement with the yoke.

It may also be desirable from time to time to lock the carriage 120 against further fore and aft movement with respect to the arm 80. The means for preventing this movement is illustrated in FIGURES 17 and 18.

The member 121 is provided with a boss 137 which is provided with a bore which receives a threaded jam screw 138. The boss is also slotted vertically at 139 to accommodate a handle 140 which is likewise threaded and mounted upon the jam screw 138. The head of the jam screw 138 is provided with parallel slots 141, any of which is adapted to loosely receive pointed set screw 142 and permit longitudinal movement of the jam screw 138 within the smooth bore. Actuation of the handle 140, which threadedly engages the jam screw 138, causes the jam screw 138 to be moved to the right and the left, depending upon the movement of the handle in a clockwise or counterclockwise direction as viewed in FIGURE 18. This will cause it to engage the guide rail 108 and lock itself and the carriage with respect thereto. If it is desired to loosen the carriage, the handle 140 is moved to the opposite direction with the result that the jam screw 138 is moved to the right, as viewed in FIGURE 17, and out of engagement with the rail 108 with the result the carriage may be moved enough along the rails 108 and 109.

The yoke assembly 150 consists generally of the upper plate member 152 and the depending front and rear webs 153 and 154 (FIGURE 12). Rear web 154 is provided with a cylindrical opening 155 which rotatably receives the round head 156 of a bolt whose threaded portion 157 is received in a similarly threaded portion in a motor support cradle 158.

The forward downwardly extending supporting web 153 is provided with an enlarged circular opening which accommodates a cylindrical extension 160 on the handle assembly 161. The handle assembly 161 is bolted to the cradle 158 by bolts 162 whereby rotation of the handle 161 about the axis of the member 160 and member 156 tips the motor 180 and cradle 158 about this axis for bevel cuts.

The front web 153 is also provided with a plurality of indexing orifices 163 (FIGURE 13) which are adapted to receive an indexing pin 164 which is normally held in indexed position by spring 165 and which may be moved from indexing position by a handle 166. The indexing orifices 163 are set in such a manner as to provide a vertical cut, 45° right and left hand bevel cuts and a horizontal cut, depending upon which one is selected and engaged by the pin 164.

Front web 153 is also provided with an arcuate ribbed portion 167 which is adapted to be engaged by a jam plug 168 which is actuated by shaft 169 which is supported in the lower portion of handle 161. The handpiece 170 is pinned to a shaft 171 which is rotatably supported in handle assembly 161 and whose lower end supports a cam 172. By rotating the handpiece 170, the operator also rotates cam 172. When cam 172 is in the position illustrated in FIGURE 12, shaft 169 and jam plug 168 are urged to the left into intimate locking contact with the ribbed portion 167. When handpiece 170 and cam 172 are further rotated, shaft 169 is relieved and the jam plug 168 is freed from locking engagement with the ribbed portion 167.

When the handpiece 170 and handle 161 are rotated about the axis 181 of the members 156 and 160, the cradle 158 and all of its associated parts will also be rotated about axis 181 (see FIGURE 11). When the desired degree of tilt has been obtained, the handpiece 170 may be rotated so that cam 172 engages the shaft 169 and urges the jam plug 168 into intimate cooperative locking engagement with the surface 167 and retains the cradle and the saw blade in predetermined position to effect a bevel cut.

Cradle 158 supports motor 180 which is substantially conventional in its form and is provided with a power takeoff shaft 182 (FIGURE 11) to which there is secured a split sheave 183 which, through belt 184 and a second split sheave 185, drives the shaft 186.

Split sheaves 183 and 185 form a part of a speed change mechanism which is actuated by a handle 187 (FIGURE 12) through shaft 188 and which actuates a cam 189. Cam 189 engages an extension on yoke 190 which is pivotally mounted in the housing 158 on a bolt assembly 191. The yoke 190 engages a cup and bearing assembly 192 which engage one side of the split sheave 185. The halves of the split sheaves 183 and 185 are adapted to be urged toward and away from each other, whereby the effective diameters of the sheaves may be changed, for example, by urging the halves of one of the sheaves together and spacing the halves of the other sheave apart. The two halves of the sheave 183 are normally urged together by spring 193. However, the effect of the spring 193 is overcome when the two halves of the sheave 185 are urged together by operation of the handle 187 which urges the bearing and cup assembly 192 to the right as viewed in FIGURE 11. This increases the effective diameter of the sheave 185 and overcomes the effect of the spring 193 on sheave 183. It is apparent therefore that by actuating handle 187 the effective diameters of the sheaves 183 and 185 may be varied, thereby effectively increasing or decreasing the speed of rotation of the shaft 186 with respect to the shaft 182.

It will be noted that the shaft 186 is rotatably mounted in bearings which are supported in the cradle 158 and shaft is double ended. Each end is provided with a flatted portion 195 which is adapted to receive a set screw 196 of an arbor construction 197 which supports a saw blade 198.

Operation of the device may briefly be described as follows: Let it be assumed that the saw blade is in the position generally illustrated in FIGURES 1 and 2, that is with the blade slightly above the upper surface of the work piece supporting surface 21.

The operator first releases the handle 140 so that the carriage 120 is free to be moved rearwardly along the arm 80. He then actuates the handle 140 to cause the jam nut 138 to engage the guide rail 108 to retain the carriage 120 in fully retracted position.

The operator then actuates the handle 49 to lock the table assembly and prevent movement with respect to the frame 10. It will be recalled that by actuating the handle 49, the shaft 44 may be rotated in such a manner that the flatted portion 45 becomes disengaged from the back-up plate 35 with the result that the two guide shoes 33 are urged toward each other thereby closing the guide slot 34 so that the side edges of the guide shoes 33 engage the rail 46.

It must be assumed, of course, that the device has been previously connected to a suitable source of electric current and that the switch assembly 98 is connected to a suitable source of power.

The work piece may be positioned on the work piece supporting surface 21 against the fence 22.

By actuating the handle 66, the collar 70, arm 80, carriage 120, yoke 150, cradle 158, and saw blade 198 may be raised or lowered and the operator turns handle 66 to bring the saw blade to the desired height to accomplish the desired depth of cut.

Assuming that the operator wishes to make a 90° cross cut, he then observes the relative positions of the pointer 79 and the indicia on the index cap 78 to determine that the arm is in proper alignment with respect to the fence 22.

He next actuates the handle 132 to determine that the yoke 150 is properly indexed with respect thereto so that the path of rotation of the saw blade will be parallel to the longitudinal axis of the arm 80. The operator then actuates the handle 170 and determines that the plunger 164 is properly seated in one of the index orifices 163 so that the plane of the saw blade is vertical to the plane of the work piece supporting surface 21.

By these various operations, the operator will have determined that the work piece supporting table is securely locked against movement with respect to the frame, that the saw blade is properly adjusted to provide the proper depth of cut, that the arm 80 is properly positioned to provide a 90° cross cut, that the yoke 150 is likewise properly adjusted with respect to the carriage 120 to provide a 90° cross cut and that the cradle 158 is so positioned with respect to the yoke 150 that the saw blade is positioned at 90° with respect to the work piece supporting surface 21.

The operator then operates the key 104 so that the tongue 103 is turned from the position illustrated in FIGURE 9 and the "On" button may be depressed. When the "On" button 99 is depressed, the "Off" button 100 will be elevated above the normal plane of the upper surface of the arm 80.

The operator then determines the proper speed for the work piece which he is cutting and by suitable manipulation of the handle 187 he causes the shaft 186 and the saw blade 198 to be driven at the proper speed for the particular job.

The operator then actuates the handle 140 in such a manner that the jam screw 138 is removed from locking contact with the guide rail 108. Then, gripping the handpiece 170, he draws the carriage, yoke, cradle, motor and saw blade across and through the work piece along the guide rails 108 and 109 to the right as viewed in FIGURE 1. When the desired cut has been completed, the "Off" button 100 is actuated to open the circuit to the motor 180. The entire assembly consisting of the carriage, yoke, cradle, motor and saw blade are then moved to an extreme left position as viewed in FIGURE 1, and the handle 140 is actuated to urge the jam nut 138 into locking engagement with the guide rail 108.

Figure 21:
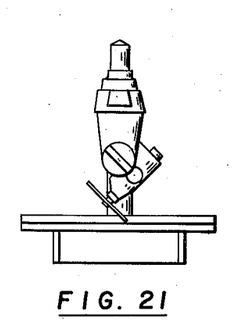
FIGURE 21 shows the saw blade mounted on the left hand end of the drive shaft for a bevel cut.

Let it be assumed that the operator desires to make a bevel cut as illustrated in FIGURE 21.

The operator rotates the handle 170 relieving the jam plug 168 from engagement with the ribbed portion 167. He then withdraws the plunger 164 from the index orifice 163 and twists the cradle about the axis 181 to the desired position. Let it be assumed that a 45° bevel cut is desired. The operator permits the plunger 164 to find its position in the suitable indexing orifice 163 and then turns the handle 170 to force the plug 168 into locking engagement with the ribbed portion 167.

The operator then energizes the motor 180 and actuates the handle 140 to release the jam screw 138. He then draws the carriage, yoke, cradle, motor and saw blade across the work piece.

It is apparent that in this operation it may be necessary to actuate the handle 66 to provide a greater depth of cut. It is to be assumed that in all of these descriptions, however, that the operator will effect a proper depth of cut by raising and lowering the arm 80 and all of its attendant and dependent parts to effect the proper depth of cut.

It must be assumed that the operator returns the carriage and saw blade to the proper position at the end of each of these operations.

Figure 20:
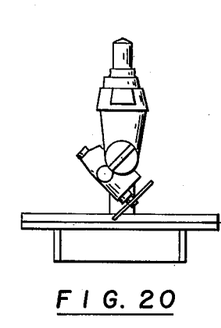
FIGURE 20 shows the saw blade mounted on the right hand end of the shaft for a bevel cut.

In the event the operator wishes to perform a bevel cut as illustrated in FIGURE 20, he first tilts the cradle to a vertical position and then releases the set screw 196 and removes the saw blade 198 and the arbor 197 from shaft 186. The saw blade and arbor are then positioned on the other end of the shaft 186.

The cradle, motor and saw blade are then tilted as has previously been described until the saw blade 198 assumes the position illustrated generally in FIGURE 20. The cutting operation is then completed.

Figure 23:
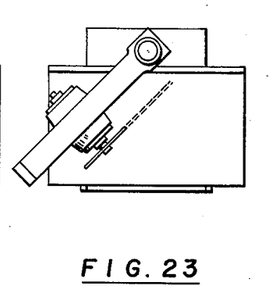
FIGURE 23 is a top view of the radial arm saw construction showing the saw blade mounted on the right hand end of the drive shaft for a left hand miter cut.

Let it be assumed that the operator wishes to make a miter cut as illustrated generally in FIGURE 23.

In this connection, let it be assumed that he has returned to "home" position from the operation illustrated generally in FIGURE 20. He will actuate the handle 170 to relieve the jam plug 168 from engagement with the ribbed portion 167 and will operate the handle 166 to remove the plunger 164 from the index orifice 163 which it occupies. He will then turn the cradle to a more or less vertical position about the axis 181 so that the saw blade assumes a vertical position with respect to the top of the work piece supporting surface 21.

The operator then actuates the handle 95 in order to urge the shaft 91 to the left, as viewed in FIGURE 7. This will remove the plunger 81 from the index orifice 83 and will also relieve the jam plug 87 from contact with the surface 77. The arm 80 is then swung generally to the position illustrated in FIGURE 23. Assuming that the operator wishes to effect a 45° miter cut, he releases the handle 95 slightly so that the plunger 81 is free to enter the miter orifice 83 which is set at an angle of 45° with respect to that illustrated in FIGURE 7. The handle 95 is swung upwardly to urge the jam plug 87 into engagement with surface 77 thus completing the locking operation.

The operator will probably actuate the handle 66 to raise the arm slightly from the position which it occupied when he was making the cut illustrated in FIGURE 20, for example.

Figure 19:
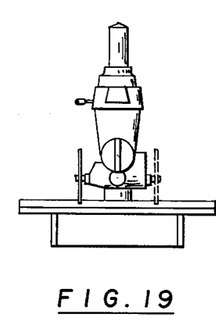
FIGURE 19 (Sheet 7) is a view, similar to FIGURE 2, showing my radial arm saw with the saw blade shown in full line position for one cutting operation and in dotted line position for a second cutting operation.

The operation of the device is then substantially the same as has previously been described in connection with making the cut previously described in connection with FIGURES 19, 20, and 21.

Figure 24:
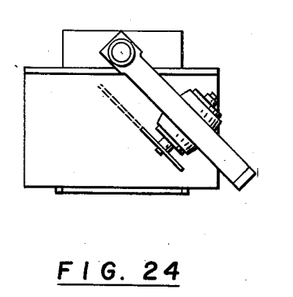
FIGURE 24 is a top view of my radial arm saw construction illustrating the saw blade mounted upon the left hand end of the drive shaft for a right hand miter cut.

Let it be assumed that the operator wishes to make the cut as illustrated in FIGURE 24, after he has just completed the cut illustrated in FIGURE 23. He operates the handle 95 to release the pin 81 and the jam plug 87 and then swings the arm 80 to his right until the pin 81 engages the indexing orifice 83a for example. He then locks the handle 95 and changes the saw blade from one end of the driven shaft to the other and completes his cut.

Figure 25:
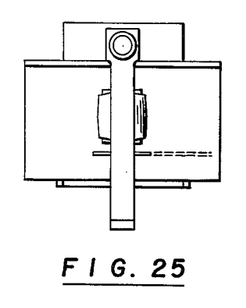
FIGURE 25 is a top view of my radial arm saw illustrating the positioning of the blade and the table when the device is to be used for a rip cut.

Let it be assumed that an operator wishes to effect a ripping operation as illustrated generally in FIGURE 25.

The arm 80 is swung to a 90° position as has previously been described. The carriage is brought forward to a predetermined position and is then locked by actuating the handle 140 in such a manner that the jam screw 138 engages the guide rail 108. The handle 135 is then actuated to withdraw the plunger 151 from engagement with one of the indexing orifices in the top of the yoke 150 and also to urge the bushing 132 upwardly from its locking engagement with the top of the yoke 150. The yoke, cradle, motor, and saw blade are then rotated around the vertical axis of the tubular extension 125 for a full 90°. The handle 135 is then swung to its center position and the plunger 151 comes to rest in and cooperates with the "90°" indexing orifice in the top of the yoke 150 and when the handle 135 is swung to its rearmost position the jam bushing 132 is brought into locking engagement with the top of the yoke 150 through washer 136 thereby locking the yoke against rotation with respect to the carriage.

The carriage and arm are thus locked and it will be noted that the plane of the saw blade 198 is both parallel to the fence 22 and vertical to the upper surface of the work piece supporting surface 21. When the motor is actuated a work piece may be urged across the table from left to right (as viewed in FIGURE 25) with one edge against the fence 22 and a cut being made by the saw blade 198 as indicated.

Figure 22:
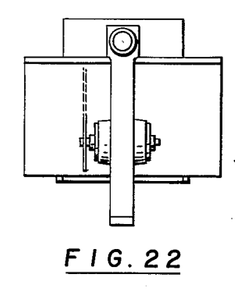
FIGURE 22 is a plan view of the device illustrated in FIGURE 19 illustrating the path of the saw blade when it is mounted on the left hand end of the drive shaft.

Utilization of the sliding table may generally be described as follows: In the first place the saw is operated generally to effect a 90° cross cut operation. However, when the saw and saw blade are positioned as illustrated generally in FIGURES 19 and 22, the width of the work piece which can be cut is limited by the stroke or length of travel of the carriage 120. In the past it has been necessary to provide a work piece supporting table in several parts to permit positioning of the fence 22 to any of a plurality of predetermined positions for a particular operation. My sliding table will permit the table to be moved quickly and positively from a particular position to another eliminating constant removal of and repositioning of the fence and speeding up operation of the table saw considerably.

It will be apparent from the foregoing that I have provided a radial arm saw which is simple to operate and which fulfills the objects set forth earlier herein.

As indicated in FIGURES 1, 26, 27, 28, and 29, I provide an auxiliary tool support member 200 which is provided with parallel spaced sockets 201 which are adapted to receive spaced parallel auxiliary tool supporting posts 202 of an auxiliary tool 203 which may be, for example, a belt sander similar to that disclosed and claimed in Edgemond et al. Patent 2,857,717, granted October 28, 1958, which clearly discloses a belt sander of the type which I have in mind. As will be seen, from an examination of that patent, the device is adapted to be supported by a pair of auxiliary tool supporting posts "16," as illustrated particularly in FIGURE 1 of that patent.

The auxiliary tool is adapted to be driven by an auxiliary tool driving shaft 204 illustrated in FIGURES 26 through 29, inclusive.

Figure 26:
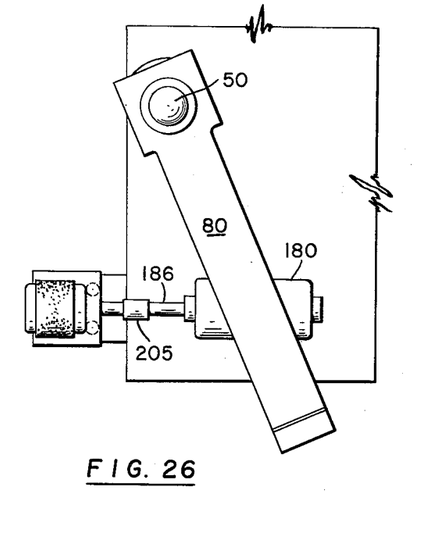
FIGURE 26 is a top view of my radial arm saw showing the way in which the same may be used to operate an auxiliary tool, as, for example, a belt sanding device which is adapted to be supported by my auxiliarly tool holder, the drive from the motor to the auxiliary tool being accomplished by means of a coupling similar to that illustrated in Edgemont et al. Patent 2,857,717, granted October 28, 1958.
Figure 27:
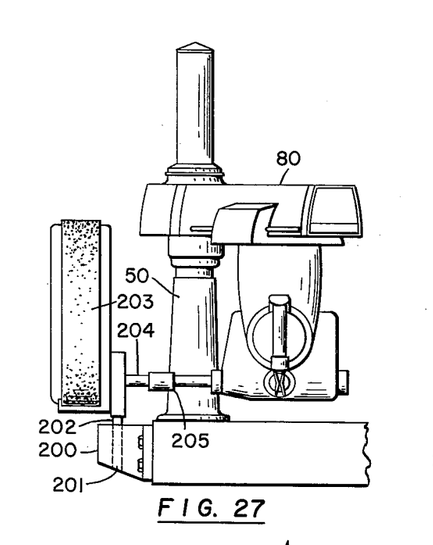
FIGURE 27 is a side view of the device illustrated in FIGURE 26.
Figure 28:
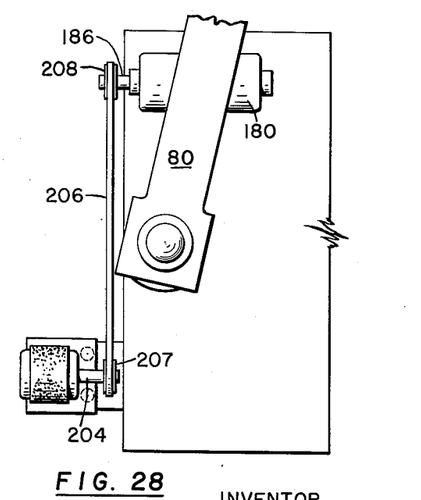
FIGURE 28 is a top view of my radial arm saw illustrating its use to drive an auxiliary tool, as, for example, a belt sander and showing the drive connection between the two as being by means of a belt.
Figure 29:
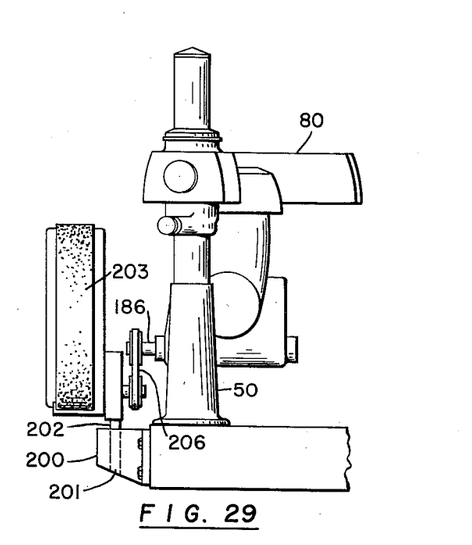
FIGURE 29 is a side view of the device illustrated in FIGURE 28.

When the auxiliary tool 203 is positioned in the auxiliary tool supporting device 200, its drive shaft 204 is ordinarily positioned at some point above the upper plane of the work piece supporting table 20. It may be driven by the motor drive shaft 186 either by the use of a coupling 205, as illustrated in FIGURES 26 and 27, or by a belt drive 206, as illustrated in FIGURES 28 and 29. The utilization of the coupling 205 or the belt 206 depends upon the type of auxiliary tool being operated. While I have illustrated a belt sander, for example, it is to be understood that any auxiliary tool, as, for example, a band saw, a jig saw, a jointer, or other auxiliary tool may be mounted in the auxiliary tool mount 200, provided that such auxiliary tool is provided with auxiliary tool supporting posts of the kind indicated at 202. The selection of the type of drive connection depends, as I have indicated, upon the type of tool selected and upon the area required by the user.

As indicated in FIGURES 26 and 27, when a coupling 205 is used, the arm 80 may be rotated about the vertical column 50 and may be raised and lowered therealong until the shaft 186 is positioned in the general horizontal plane as the shaft 204. The motor 180 may be moved along the radial arm 80 until the shaft 186 is in the same vertical plane as the driven shaft 204. The motor may be started and stopped as has previously been described and, as it is readily apparent, therefore, that the auxiliary tools may be readily connected or disconnected from the motor 180. By the use of the speed changer assembly, it is possible to control the speed at which the auxiliary tool is driven.

As illustrated in FIGURES 28 and 29, the radial arm 80 is swung generally to the position illustrated therein and suitable pulleys 207 and 208 are connected to the shafts 204 and 186, respectively. The motor 180 is moved along the radial arm 80 and the arm 80 is rotated until the two pulleys 207 and 208 occupy the same general vertical plane. The belt 206 is positioned about this. The belt may be tightened by moving the motor 180 along the arm 80. In this manner the auxiliary tool is operated, and it is readily apparent that the same may be started or stopped or driven at variable speeds in the same manner as the radial arm saw previously described herein.

It will be readily apparent that I have provided a radial arm saw which may be utilized in connection with a plurality of auxiliary tools and, while I have illustrated a preferred type of auxiliary tool mounting, it is to be readily understood that any form of auxiliary tool mounting may be utilized in connection with my device.

I claim:

1. In a radial arm saw adapted to be driven by an electric motor, means for connecting the same to a source of electric current, a switch for interrupting or connecting the motor to said source of electric current, said switch having an "On" button and an "Off" button, said switch being positioned in said radial arm, said buttons adapted to project through orifices in said radial arm, the orifice through which said "Off" button extends being in a plane generally coplanar with the surrounding area and the orifice through which said "On" button projects being accommodated within a recess, said switch being so constructed that when the "On" button is activated, the "Off" button projects through its orifice above the plane of said arm and when said "Off" button is activated, said "On" button extends through its orifice into said depression but in no event above the plane of said radial arm surrounding said depression, and a key actuated lock, said lock being coupled to said "On" button and serving to selectively prevent depression of same to preclude inadvertent connection of said motor with said source of current.

2. In a radial arm saw construction comprising a frame, a fixed column, and a radial arm pivotally mounted on said column and movable longitudinally with respect to said column, a carriage movable along said arm toward and away from said column, a yoke rotatably mounted on said carriage, a motor rotatably mounted in said yoke for movement about a horizontal axis, handle means mounted on said motor for controlling the movement of the same about said horizontal axis, said handle means comprising a cylindrically shaped member rotatable about the longitudinal axis thereof and supporting a cam at one end, and a shaft engageable by said cam and adapted to be urged into intimate locking relationship with said yoke whereby, when said motor has been tilted about said horizontal axis it may be locked in a predetermined position with respect thereto by rotation of said cylindrically shaped member.

3. In a home workshop radial arm saw supported above a work surface of limited extent, a motor including an armature axle, a double-ended tool-support shaft formed to removably receive a disc saw blade at each end thereof, the axis of said shaft being disposed parallel to and spaced sufficiently below said axle to locate each end of said shaft clear of the surrounds to accommodate a disc saw blade disposed thereon and to render the full cutting depth of said saw blade accessible, whereby both right hand and left hand miter cuts can be made with said saw operating substantially centrally of said work surface.

4. Radial arm saw apparatus as defined in claim 3 further including a speed change mechanism operatively coupled to said motor and serving to actuate said shaft.

5. In a radial arm saw having a hollow radial arm, a carriage movable along said arm and supporting a motor, and means for connecting said motor to a source of electric current; a rod within said arm extending lengthwise thereof, and said connecting means comprising a cord coiled about said rod so as to extend and contract in response to the position of said carriage and motor along said radial arm, while being supported within said arm regardless of the degree of extension or contraction of said cord.

References Cited in the file of this patent

UNITED STATES PATENTS

| | | |
|---|---|---|
| 493,546 | Dodge | Mar. 14, 1893 |
| 934,484 | Wadkin et al. | Sept. 21, 1909 |
| 1,528,535 | De Walt | Mar. 3, 1925 |
| 1,528,536 | De Dalt | Mar. 3, 1925 |
| 1,893,827 | Getchell | Jan. 10, 1933 |
| 1,956,835 | Roemer | May 1, 1934 |
| 2,022,289 | Knapp | Nov. 26, 1935 |
| 2,089,363 | Haas | Aug. 10, 1937 |
| 2,257,744 | Heyer | Oct. 7, 1941 |
| 2,312,356 | Ocenasek | Mar. 2, 1943 |
| 2,329,357 | Mowery et al. | Sept. 14, 1943 |
| 2,392,070 | Snyder | Jan. 11, 1946 |
| 2,489,420 | Kirk et al. | Nov. 29, 1949 |
| 2,584,863 | Gesner | Feb. 5, 1952 |
| 2,589,554 | Killian | Mar. 18, 1952 |
| 2,590,093 | Duerr | Mar. 25, 1952 |
| 2,621,686 | Tompkins | Dec. 16, 1952 |
| 2,628,643 | Tompkins | Feb. 17, 1953 |
| 2,672,170 | Johnson | Mar. 16, 1954 |
| 2,835,285 | Gardner | May 20, 1958 |
| 2,870,801 | Cravens | Jan. 27, 1959 |
| 2,899,990 | Landis | Aug. 18, 1959 |
| 2,942,632 | Cassey | June 28, 1960 |
| 3,023,792 | Palmer et al. | Mar. 6, 1962 |

FOREIGN PATENTS

| | | |
|---|---|---|
| 266,439 | Switzerland | Apr. 17, 1950 |

OTHER REFERENCES

Publication: "De Walt Power Shop," published by De Walt Power Tools, Lancaster, Pa., copyright 1954.